Sheet 2 — 2 Sheets.
I. Van Kersen.
Wagon Box Lifter.
N° 111,021. Patented Jan. 17, 1871.
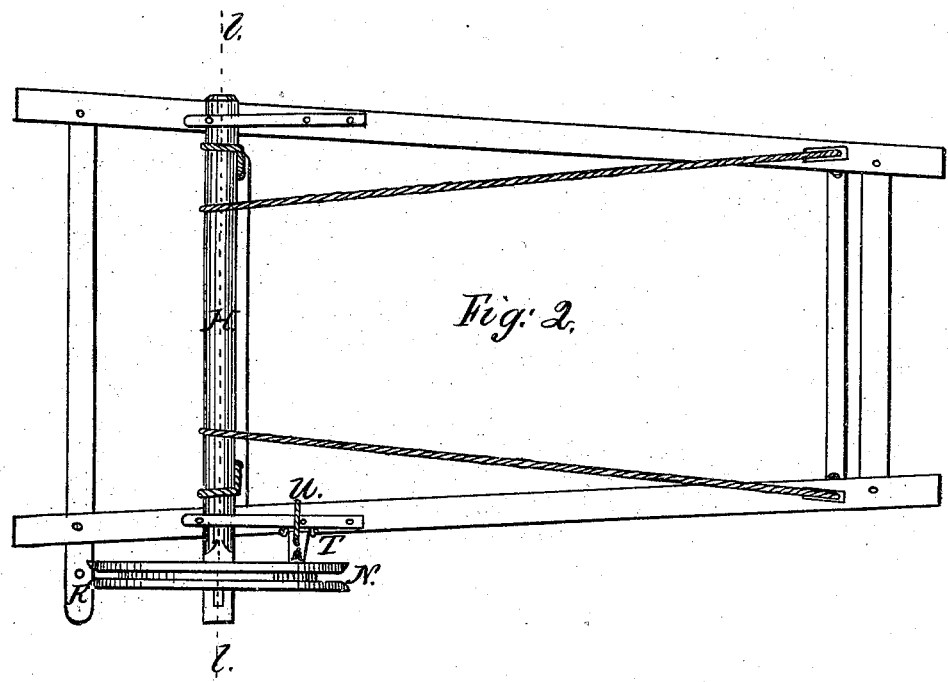
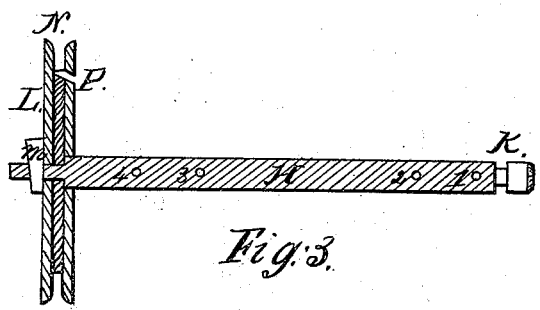
Witnesses.
Amos D. Allen.
Rollin Wood.
Inventor.
Izaak van Kersen.

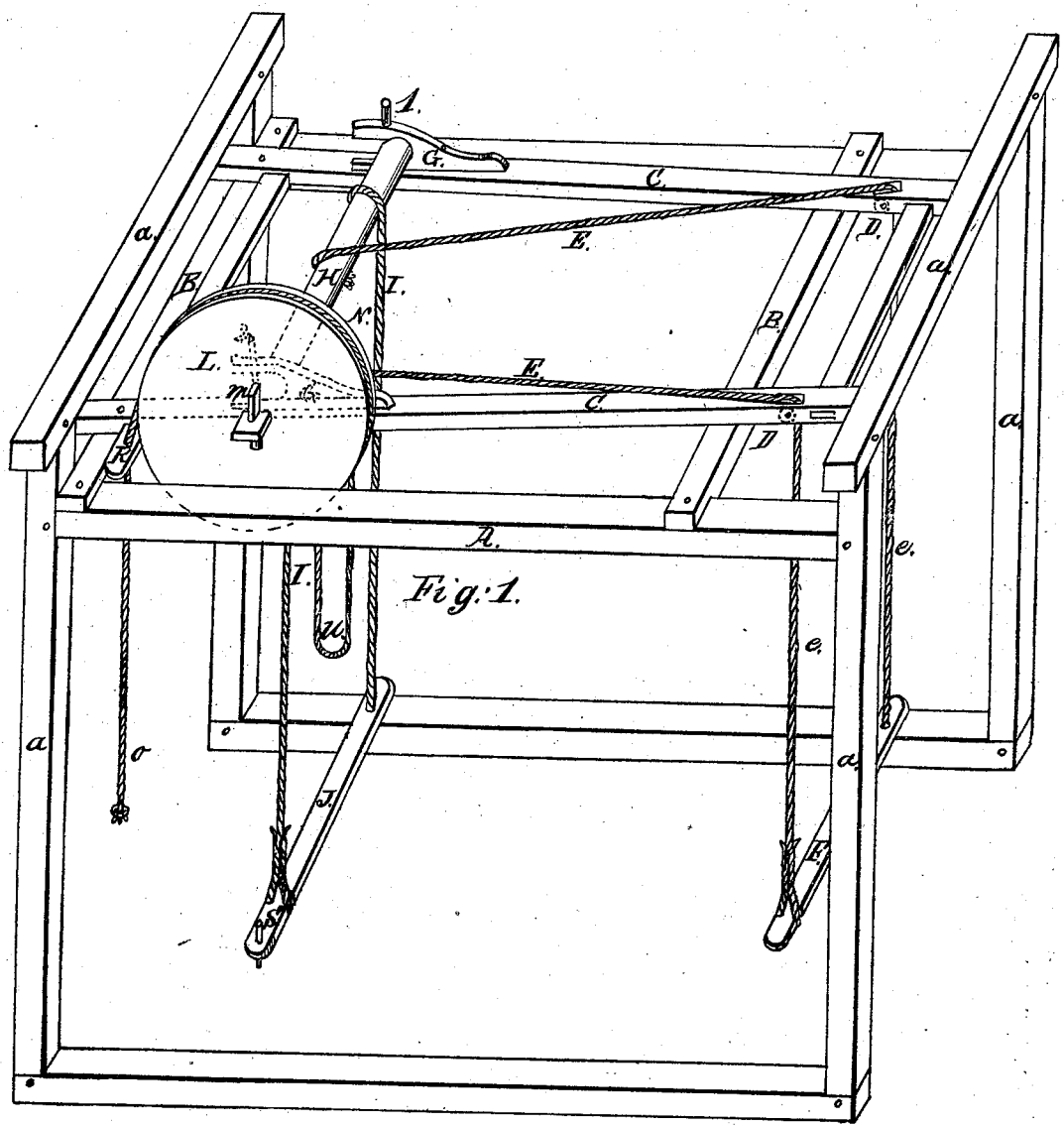

United States Patent Office.

IZAAK VAN KERSEN, OF KALAMAZOO, MICHIGAN.

Letters Patent No. 111,021, dated January 17, 1871.

IMPROVEMENT IN WAGON-BOX AND WAGON-RACK LIFTERS.

The Schedule referred to in these Letters Patent and making part of the same.

I, IZAAK VAN KERSEN, of Kalamazoo, in the county of Kalamazoo, State of Michigan, have invented certain Improvements in Wagon-box, Wood-rack, and Hay-rack Lifters, of which the following is a specification.

The nature of this invention relates to improvements in apparatus for removing wagon-boxes, wood-racks, and hay-racks from wagons, and for replacing them again, whereby it is designed to save heavy lifting required to remove them by hand, and also to economize room for storing them.

It consists in providing within the building used for the purpose, near the top, a frame with two clamps and two pulleys, and a pawl with double cord, an axle or windlass with double holes for double ropes at each end, with cross-beams below, and a pulley with pawl-bits, over which a rope works, whereby the said windlass is operated to raise the box or rack from the wagon, where it may be suspended till required for use again by fastening the rope so as to hold it.

On reference to the drawing—

Figure 1 is a perspective view.

Figure 2 is a level or horizontal view of my invention.

Figure 3 is a section of the windlass and pulley L, in the line $l\ l$, fig. 2.

A $a$ represent the frame of the building;

B B are two cross-beams, fastened to the building-frame; and

C C represent the frame of my invention fastened upon the cross-beams B B.

By D D are two pulleys, whereover run the ropes E E, with a cross-beam, F, below.

In this cross-beam is a hole at one end, wherein a rope is fastened, and to the other end are two notches, wherein the other rope E $e$ is fastened with a loop.

Upon the frame C C are fastened the crotches G G, wherein the windlass H is locked in with the wooden pins 1 and 2.

In this windlass are four holes, Nos. 1, 2, 3, and 4, fig. 3. The holes 2 and 3 are for fastening the ropes E $e$, fig. 1, and the holes 1 and 4 are for fastening the ropes I I with a cross-beam, J, below fastened in the same way as the cross-beam F.

At one end, from the windlass H, fig. 3, is, by K, an excavation, to keep the windlass to its place, and to the other end is the pulley L, with pawl-bits to hold them.

The pulley is fastened with the wedge $m$, and by N is the groove for the rope O, which is fastened in the hole $p$, and run round the pulley and through the straightening-hole R, seen in figs. 1 and 2.

The pawl T, with a double cord, U, holds the pulley in the pawl-bits from going back while raising a box or rack from the wagon.

When the box or rack is to be removed, the wagon standing under the frame C C, the cross-beams F and J being under the box or rack, pull down the rope O, whereby the box or rack is raised to an elevated position out of the way, and fasten the rope O to the cross-beam J by the pin S.

When it is to be applied to the wagon again, loose the pawl T with the rope O and the cord U, and let down slowly the box or rack to the wagon.

I claim as my invention—

The frame C C, provided with pulleys D D, clamps G G, and pawl F, in combination with windlass H, drops E E, and cross-beams F and J, all combined, arranged, and constructed as and for the purposes set forth.

IZAAK VAN KERSEN.

Witnesses:
AMOS D. ALLEN,
ROLLIN WOOD.